United States Patent [19]

Kurata et al.

[11] Patent Number: 5,633,537
[45] Date of Patent: May 27, 1997

[54] MULTIPLEX TRANSMISSION APPARATUS

[75] Inventors: Yasuhiko Kurata, Higashihiroshima; Yuichi Akiyama, Kure, both of Japan

[73] Assignees: Mazda Motor Corporation; Naldec Corporation, Hiroshima, Japan

[21] Appl. No.: 274,717

[22] Filed: Jul. 18, 1994

[30] Foreign Application Priority Data

Jul. 19, 1993 [JP] Japan .................. 5-177965

[51] Int. Cl.$^6$ .................. H04J 3/14; H04L 12/40
[52] U.S. Cl. .................. 307/10.6; 307/10.1; 370/241; 340/825.06
[58] Field of Search .................. 307/9.1–10.8, 307/126, 141.4, 141.8; 370/85.1, 85.9, 85.2, 85.6; 340/825.05, 825.06

[56] References Cited

U.S. PATENT DOCUMENTS

| | | | |
|---|---|---|---|
| 4,887,263 | 12/1989 | Steely | 370/85.1 |
| 5,305,316 | 4/1994 | Yoshida | 370/85.1 |
| 5,408,471 | 4/1995 | Nobutoki | 370/85.1 |

FOREIGN PATENT DOCUMENTS 1-143535   6/1989   Japan .

Primary Examiner—William M. Shoop, Jr.
Assistant Examiner—Peter Ganjoo

[57] ABSTRACT

When it is detected that the state of an electrical component connected to a communication node has not changed in the OFF state of an ignition key switch, it is determined that a vehicle equipped with the multiplex transmission apparatus is in a parking state, and the communication node is forcibly shifted to a sleep state, thereby preventing consumption of battery power due to a dark current supplied to the communication node in the sleep state.

17 Claims, 6 Drawing Sheets

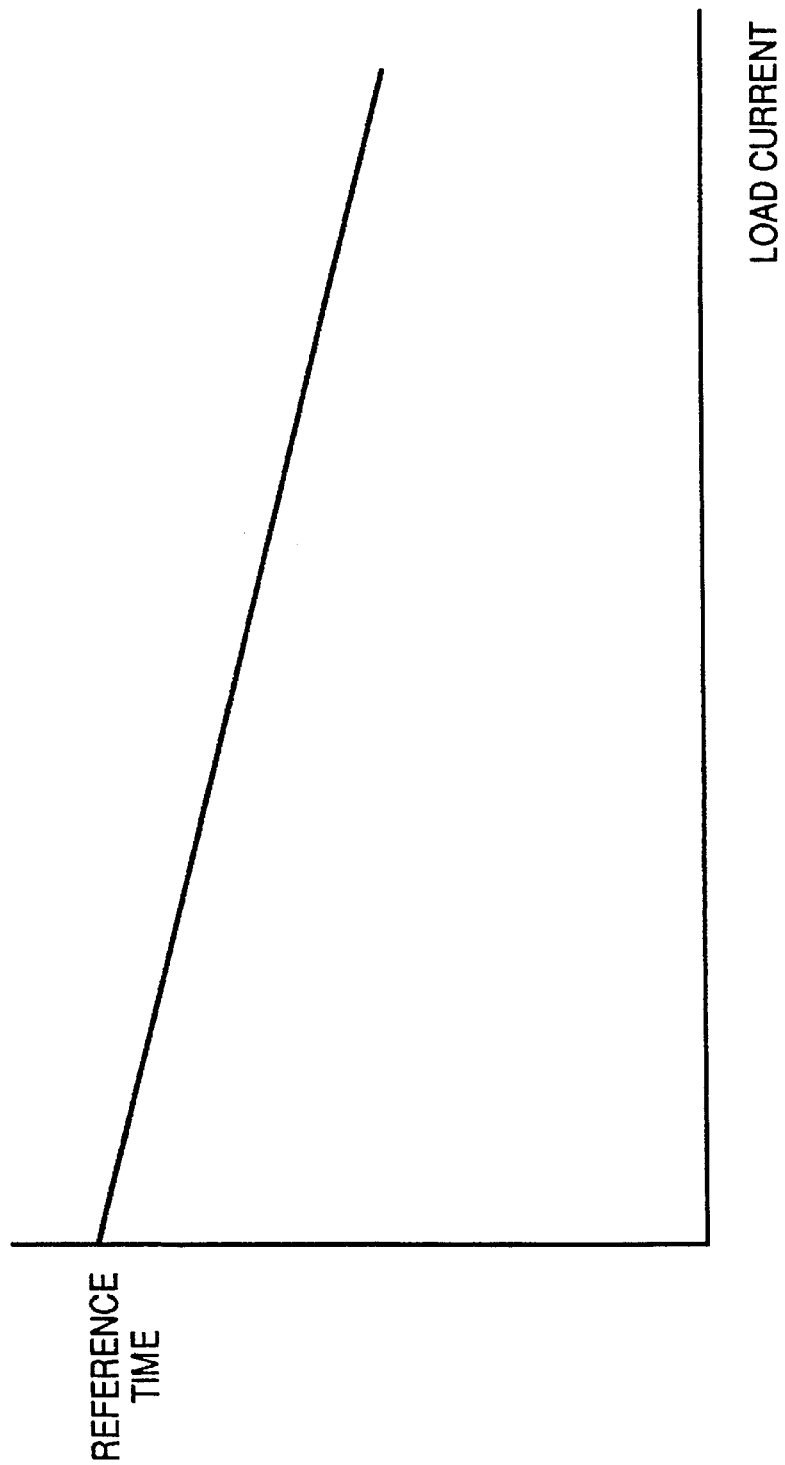

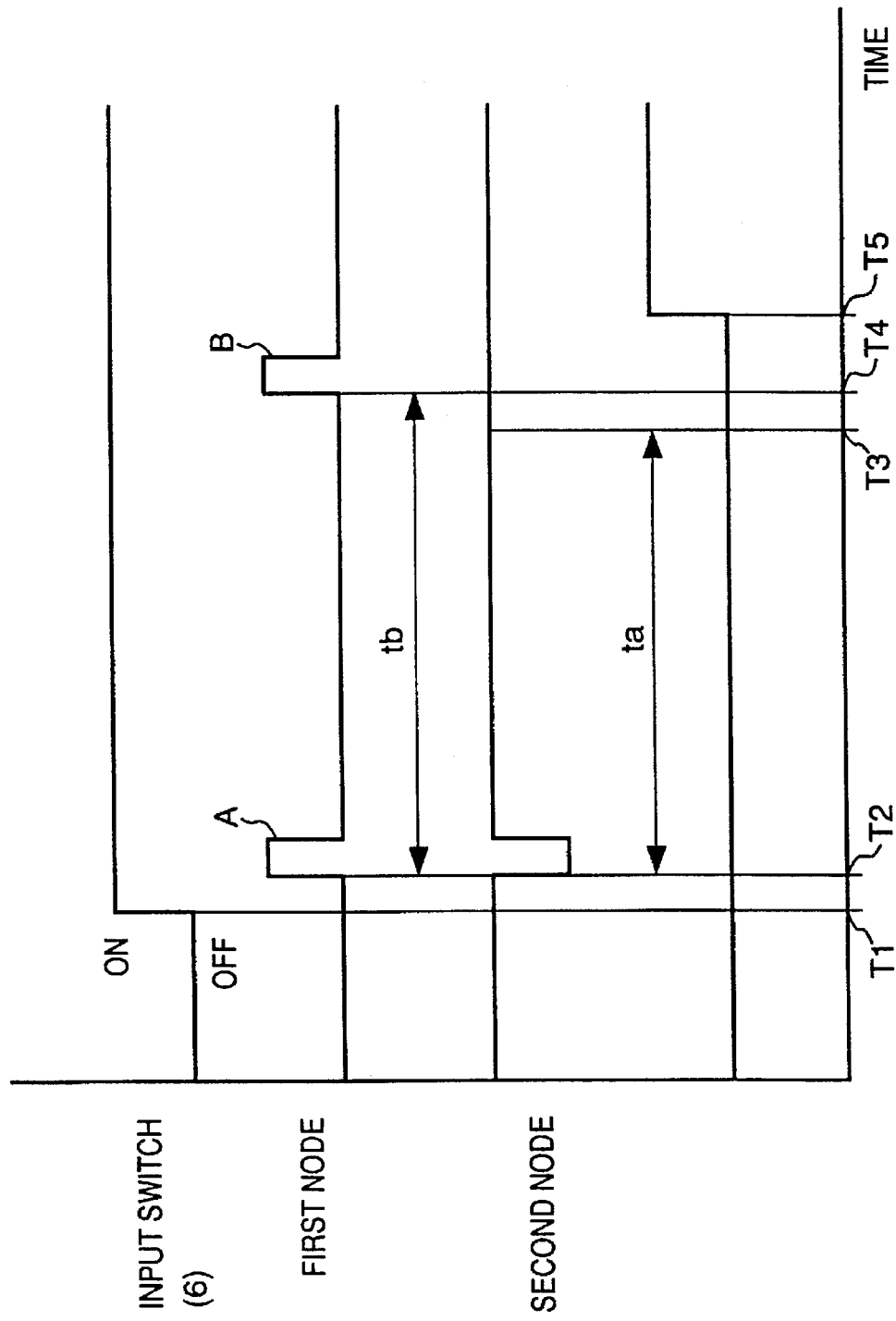

MULTIPLEX TRANSMISSION APPARATUS

BACKGROUND OF THE INVENTION

1. Field of the Invention

The present invention relates to a multiplex transmission apparatus which has a plurality of communication nodes connected via a multiplex bus, and outputs an operation command signal from a communication node connected to an input switch to another communication node connected to an electrical component via the multiplex bus.

2. Description of the Related Art

Conventionally, as disclosed in Japanese Patent Laid-Open No. 1-143535, a multiplex transmission system has been proposed. In this system, a plurality of communication nodes equipped in, e.g., a vehicle are connected in a network pattern using a common multiplex bus, and the multiplex bus is shared by a plurality of electrical components, thereby simplifying the harness structure for connecting the electrical components and input switches for operating these members.

The multiplex transmission system includes communication nodes which are set in a sleep state, i.e., an inoperative state when an ignition switch is turned off, and communication nodes which are set in a wake-up state, i.e., an operable state by a battery power supply even when the ignition key is not ON. Communication nodes for controlling electrical components such as door lock switches, head lamps, and the like, which must operate when the ignition switch is in an OFF state are maintained in the wake-up state by electrical power supplied from the battery power supply, thereby allowing operations of these electrical components.

When the communication nodes which are to be set in the wake-up state by the battery power supply are always maintained in the wake-up state, a dark current flows to waste battery power. For this reason, when the door locks are locked after the ignition key switch is set in the OFF state, and it is confirmed that none of the electrical components are in operation, the communication nodes are shifted to the sleep state.

More specifically, by detecting the operating states of electrical components or detecting the operating states of input switches, it is confirmed that none of the electrical components are in operation, and thereafter, the communication nodes are shifted to the sleep state. For this reason, if the operating state of at least one of the electrical components cannot be properly detected, the communication nodes cannot be shifted to the sleep state, and waste of battery power cannot be avoided.

SUMMARY OF THE INVENTION

The present invention has been made to solve the conventional problems, and has as its object to provide a multiplex transmission apparatus which can effectively prevent waste of battery power by properly shifting communication nodes to the sleep state.

In order to achieve the above object, according to the present invention, there is provided a multiplex transmission apparatus which comprises a plurality of communication nodes connected to each other via a multiplex transmission path, and a plurality of electrical components to be controlled by the plurality of communication nodes, each of the plurality of communication nodes being set in one of an operative state, an inoperative state, and an operable state, comprising first detection means for detecting an ON/OFF state of an ignition key switch, means for monitoring operative/inoperative states of the electrical components, means for setting a predetermined reference time in accordance with the monitoring result, second detection means for detecting a change in state of the electrical component within the reference time, and control means for, when the ignition key switch is in an OFF state, and it is detected that the state of the electrical component has not changed within the reference time, setting the communication node associated with control of the electrical component in the inoperative state.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a graph showing the relationship between the reference time for change detection, and the power consumption; and FIG. 6 is a timing chart showing the control operation in the wake-up mode.

DETAILED DESCRIPTION OF THE PREFERRED EMBODIMENT

Figure 1:
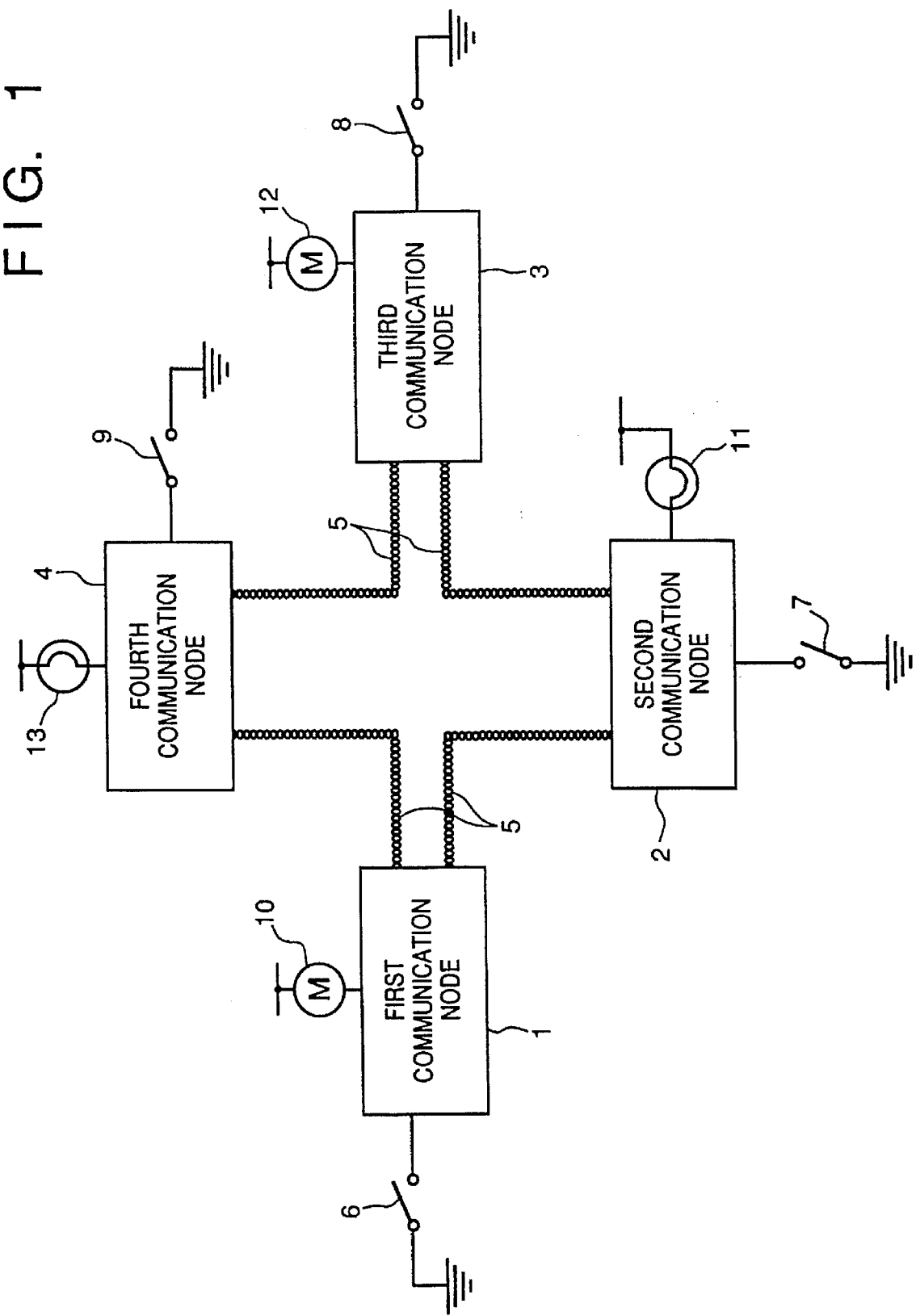
FIG. 1 is a block diagram showing the arrangement of the entire multiplex transmission apparatus according to the present invention.

FIG. 1 shows the arrangement of the entire multiplex transmission apparatus according to the present invention. The multiplex communication apparatus comprises first to fourth communication nodes 1 to 4 equipped in, e.g., a vehicle, and multiplex buses 5 comprising twisted pair cables for connecting neighboring ones of the communication nodes 1 to 4. The communication nodes 1 to 4 are respectively connected to input switches 6 to 9 and electrical components 10 to 13. For example, the input switch 6 for operating head lamps is connected to the first communication node 1 arranged near an operation panel, and an electrical component 11 comprising the head lamps which are turned on upon operation of the input switch 6 are connected to the second node 2 arranged near the front portion of a vehicle body.

In this embodiment, a single input switch and a single electrical component are connected to each of the communication nodes 1 to 4. However, a plurality of input switches and electrical components may be connected to each of the communication nodes 1 to 4, or a connection portion of either one of the input switch or the electrical component may be omitted.

Figure 2:
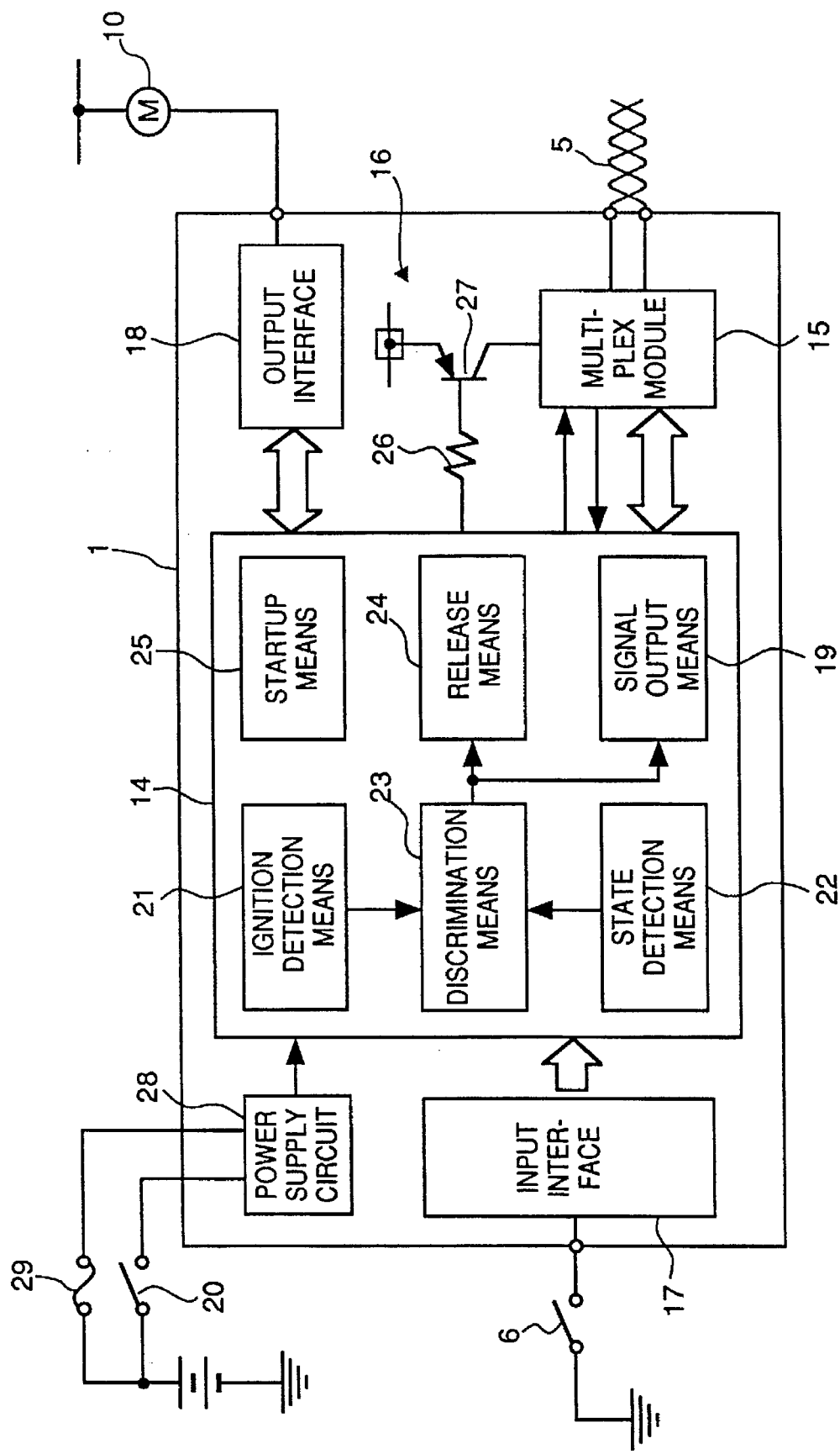
FIG. 2 is a block diagram showing the internal arrangement of a communication node.

As shown in FIG. 2, the first communication node 1 comprises a microcomputer 14, a multiplex module 15 connected to the microcomputer 14, for inputting/outputting a control signal consisting of multiplex signals, a wake-up circuit 16 for shifting the multiplex module 15 from a sleep state to a wake-up state, an input interface 17 for connecting the input switch 6 and the microcomputer 14, and an output interface 18 for connecting the electrical component 10 and the microcomputer 14.

The microcomputer 14 of the first communication node 1 comprises a signal output means 19 for outputting a multiplex signal to the other communication nodes 2 to 4 via the multiplex module 15 and the multiplex buses 5, an ignition detection means 21 for detecting the ON/OFF state of an ignition key switch 20, a state detection means 22 for detecting the operating states of the electrical components 10 to 13, a discrimination means 23 for discriminating whether or not the communication nodes 1 to 4 are to be shifted to the sleep state, a release means 24 for shifting the first communication node 1 in the wake-up state to the sleep state in accordance with the discrimination result of the discrimination means 23, and a startup means 25 for shifting the first communication node 1 which is in the sleep state when it is in a wake-up shift mode (to be described later) to the wake-up state.

The signal output means 19 outputs, to the other communication nodes 2 to 4, a wake-up signal for shifting the other communication nodes 2 to 4 to the wake-up state in the wake-up shift mode, and an operation command signal for turning on the electrical component 11 comprising head lamps connected to the second communication node 2 upon operation of the input switch 6. Also, the signal output means 19 simultaneously outputs a sleep signal for shifting the other communication nodes 2 to 4 to the sleep state in accordance with the discrimination result of the discrimination means, and a control signal for setting those of the electrical components 10 to 13, which are in the operative state, in an inoperative state.

The output interval between the wake-up signal and the operation command signal, which are output from the signal output means 19 in the wake-up shift mode, is set to be slightly longer than a time required for shifting the communication nodes 1 to 4 from the sleep state to the wake-up state, i.e., the wake-up rise time. The signal output means 19 also serves as a refresh signal output means for periodically outputting a refresh signal indicating the state of, e.g., the electrical component 11 when the communication node 1 is in the wake-up state.

The discrimination means 23 discriminates in accordance with detection signals output from the ignition detection means 21 and the state detection means 22 whether or not the states of the electrical components 10 to 13 have changed within a predetermined reference time when the ignition key switch 20 is OFF. More specifically, the discrimination means 23 discriminates whether or not the state of at least one of the electrical components 10 to 13 has changed from the operative state to the inoperative state within the reference time, or vice versa, and outputs the discrimination result to the release means 24 and the signal output means 19.

When the discrimination means 23 confirms that the states of none of the electrical components 10 to 13 have changed within the reference time, the release means 24 sets the microcomputer 14 in a low-current mode, and stops supply of a current to the multiplex module 15, as will be described later, thereby shifting the first communication node 1 to the sleep state.

As the reference time, various kinds of times Rn are set in correspondence with the number of electrical components in the operative state among the electrical components 10 to 13. When one of all the electrical components 10 to 13 is in the operative state, the longest time Ri is selected. As the number of electrical components in the operative state among the electrical components 10 to 13 increases, a reference time Rn having a larger value is selected. On the other hand, when all the electrical components 10 to 13 are in an inoperative state, a reference time Ro shorter than the reference time Rn is set, since it is considered that a sleep condition is established.

The startup means 25 shifts the microcomputer 14 and the multiplex module 15 of the first communication node 1 in the sleep state to the wake-up state in response to a wake-up signal input, via the multiplex buses 5 and the multiplex module 15, from another communication node connected to the input switch corresponding to the electrical component 10 of the first communication node 1.

The multiplex module 15 is connected to the neighboring second and fourth communication nodes 2 and 4 via the corresponding multiplex buses 5, and is connected to the third communication node 3 via these second and fourth communication nodes 2 and 4. Also, the multiplex module 15 inputs a wake-up signal from each of these communication nodes 2 to 4 to the startup means 25 of the microcomputer 14, and outputs the wake-up signal and the operation command signal output from the signal output means 19 to the other communication nodes 2 to 4.

The wake-up circuit 16 has a transistor 27 connected to the release means 24 and the startup means 25 of the microcomputer 14 via a resistor 26. When the discrimination means 23 confirms that the states of the electrical components 10 to 13 have not changed within the reference time in a case where the ignition key switch 20 is in the OFF state, the voltage to be applied to the base of the transistor 27 via the release means 24 is increased. Thus, the transistor 27 is turned off, and supply of a current to the multiplex module 15 is stopped, thereby shifting the multiplex module 15 to the sleep state.

When the first communication node 1 is in the sleep state and a wake-up signal is input to the startup means 25 of the microcomputer 14, the voltage to be applied to the base of the transistor 27 of the wake-up circuit 16 via the startup means 25 is decreased, thereby turning on the transistor 27. As a result, a current is supplied to the multiplex module 15, and the multiplex module 15 is shifted to the wake-up state.

The first communication node 1 comprises a power supply circuit 28 for outputting a command signal for forcibly setting the microcomputer 14 and the multiplex module 15 in a wake-up state when the ignition key switch 20 is operated. A fuse 29 is connected to the power supply circuit 28 in parallel with the ignition key switch 20. If the fuse 29 is set in an OFF state when a vehicle is manufactured until the beginning of use of the vehicle is manufactured, the first communication node 1 can be prevented from being unnecessarily set in the wake-up state and battery power can be prevented from being wasted.

Figure 3:
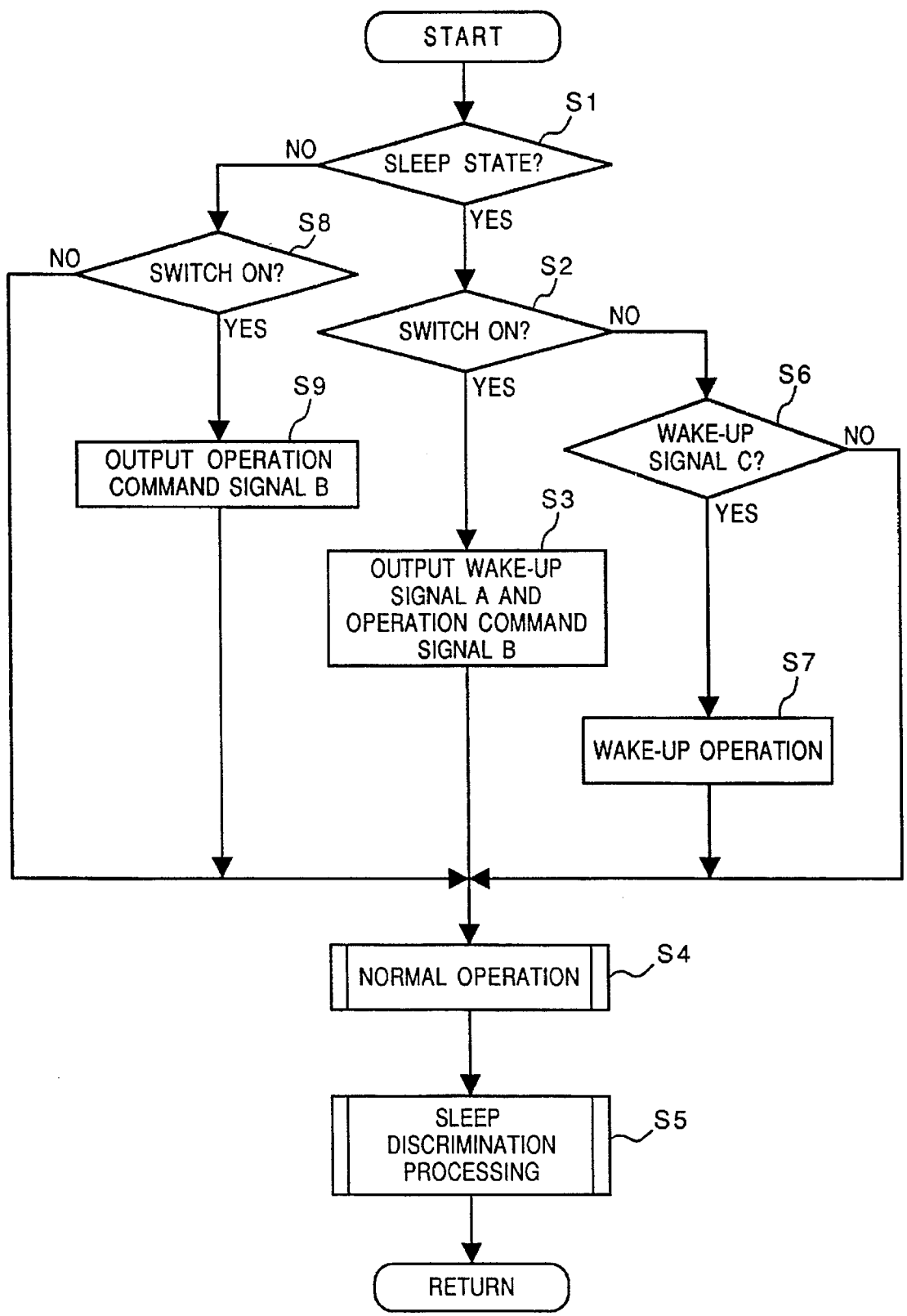
FIG. 3 is a flow chart showing a control operation in a wake-up mode.

The control operation in the first communication node 1 with the above-mentioned arrangement will be described below with reference to the flow chart shown in FIG. 3. When the control operation is started, it is checked in step S1 whether the first communication node 1 is currently set in the sleep state. If YES in step S1, it is checked in step S2 whether the input switch 6 is turned on for operating the head lamps.

If YES in step S2, a wake-up signal A for shifting the communication nodes 1 to 4 from the sleep state to the wake-up state and an operation command signal B for turning on the electrical component (e.g. head lamps) 11 of the second communication node 2 are transmitted at a predetermined interval via the multiplex buses 5 in step S3. More specifically, the operation command signal B is output after an elapse of a time slightly longer than the wake-up rise time of each of the communication nodes 1 to 4 from when the wake-up signal A is output.

In step S4, a normal operation is executed for controlling the operating state of the electrical component 10 connected to the first communication node 1 in accordance with operation command signals output from the other communication nodes 2 to 4. Thereafter, sleep discrimination processing (to be described later) for shifting the communication nodes 1 to 4 to the sleep state is executed in step S5. Then, the flow returns.

On the other hand, if NO in step S2, i.e., if it is confirmed that the input switch 6 is OFF, it is checked in step S6 whether a wake-up signal C is output from the other communication nodes 2 to 4 for shifting the communication nodes 1 to 4 from the sleep state to the wake-up state. If YES in step S6, an operation for setting the microcomputer 14 and the multiplex module 15 in the wake-up state is executed in step S7, and thereafter, the flow advances to step S4.

If NO in step S1, i.e., if it is confirmed that the first communication node 1 is currently set in the wake-up state, it is checked in step S8 whether the input switch 6 is turned on for operating the head lamps. If YES in step S8, the operation command signal B is output via the multiplex bus 5 in step S9 for turning on the electrical component (e.g. head lamps) 11 of the second communication node 2, and thereafter, the flow advances to step S4.

Figure 4:
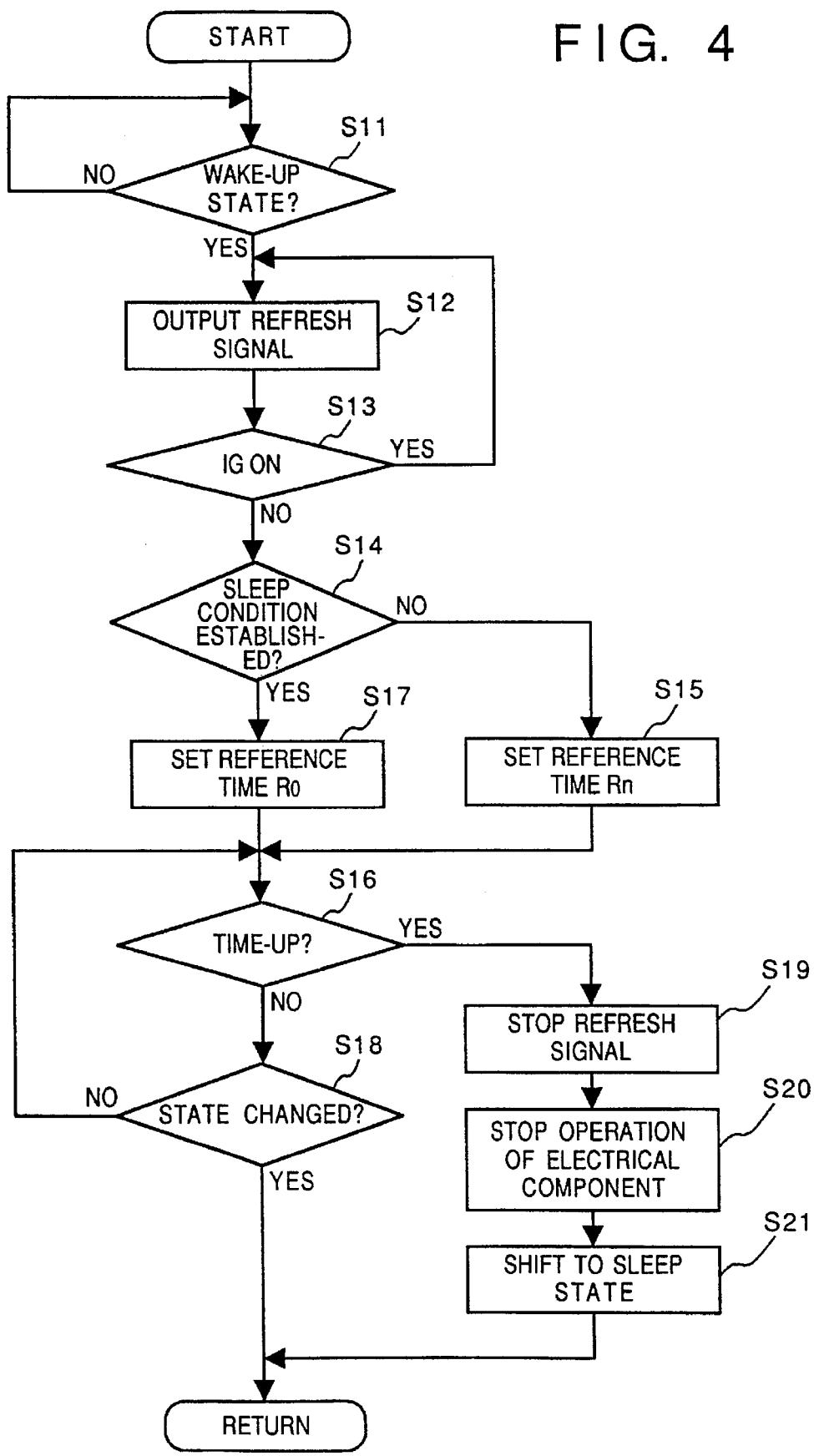
FIG. 4 is a flow chart showing a control operation of sleep discrimination processing.

The control operation of the sleep discrimination processing in step S5 will be described below with reference to the flow chart in FIG. 4. When this control operation is started, it is checked in step S11 whether the first communication node 1 is in the wake-up state. If YES in step S11, a refresh signal indicating the operating state of the input switch 6, the operating state of the electrical component 10, and the like is output in step S12.

Thereafter, in step S13, it is checked whether the ignition key switch 20 is in an ON state. If YES in step S13, the flow returns to step S12, since the communication nodes 1 to 4 need not be shifted to the sleep state. However, if NO in step S13, i.e., if it is confirmed that the ignition key switch 20 is in an OFF state, it is checked in step S14 whether all the electrical components are set in an inoperative state and the sleep condition is established.

If NO in step S14, i.e., if it is confirmed that at least one of the electrical components 10 to 13 is in the operative state, the reference time Rn is read out in step S15, for discriminating a change in the number of electrical components in the operative state, and thereafter, it is checked in step S16 whether a timer (not shown) set with the reference time Rn has run out. On the other hand, if YES in step S14, i.e., if it is confirmed that all the electrical components 10 to 13 are in an inactive state, a reference time Ro which is shorter than the reference time Rn and indicates an establishment of the sleep condition, is set in step S17.

If the timer has not run out, it is checked in step S18 whether the states of the electrical components 10 to 13 have changed. If NO in step S18, the flow returns to step S16 to repeat this processing until the timer runs out. If, on the other hand, it is confirmed in step S18 that the states of the electrical components 10 to 13 have changed during this processing, this sleep discrimination processing ends, and the communication nodes 1 to 4 are maintained in the wake-up state.

If it is confirmed in step S16 that the timer has run out before the states of the electrical components 10 to 13 change, transmission of the refresh signal is stopped in step S19, and thereafter, a control signal is output in step S20 for disabling any electrical component in the operative state. In step S21, sleep control is executed for shifting the communication nodes 1 to 4 from the wake-up state to the sleep state.

As described above, since the discrimination means 23 discriminates whether or not the operating states of the electrical components change within the predetermined reference time when the ignition key switch 20 is in the OFF state, it can be accurately determined whether or not the communication nodes 1 to 4 must be shifted to the sleep state. For this reason, the communication nodes 1 to 4 can be shifted from the wake-up state to the sleep state at a proper timing.

More specifically, if it is confirmed that none of the input switches have been operated and the states of the electrical components 10 to 13 have not changed within a predetermined period of time, it is determined that a vehicle equipped with the above-mentioned multiplex transmission apparatus is shifted to a parking state or the like, and a driver does not intend to operate the electrical components 10 to 13, thus forcibly shifting the communication nodes 1 to 4 to the sleep state.

Therefore, it can be accurately determined that the vehicle is shifted to a parking state or the like, even when the inoperative state of one of the electrical components 10 to 13 cannot be detected due to failures such as a malfunction of the input switches 6 to 9, disconnection or short-circuiting of the harness, or the like despite the fact that the driver stops the operations of the electrical components 10 to 13 and then leaves a vehicle, or when the driver leaves the vehicle without stopping the operation of a specific electrical component. By shifting the communication nodes 1 to 4 to the sleep state in accordance with the discrimination result of the discrimination means 23 or the like when the vehicle is in the parking state, a dark current flowing through the communication nodes 1 to 4 can be decreased, thus effectively suppressing wasting of battery power.

When the communication nodes 1 to 4 are shifted to the sleep state in accordance with the discrimination result of the discrimination means 23, the control signal is output for setting the electrical components 10 to 13, which are in the operative state, in the inoperative state. Therefore, even when the driver leaves the vehicle without disabling the electrical components 10 to 13, any electrical component in the operative state can be forcibly set in an inoperative state, thus preventing wasting of battery power caused by the operation error of the driver.

In the above embodiment, since the reference time Ro for change discrimination used when all the electrical components 10 to 13 are in the inoperative state is set to be shorter than the reference time Rn for change discrimination used when at least one of the electrical components 10 to 13 is in the operative state, the communication nodes 1 to 4 can be quickly shifted to the sleep state, thus effectively suppressing wasting of battery power, when all the electrical components 10 to 13 are in the inoperative state, i.e., the sleep condition is established.

Upon establishment of the sleep condition, in place of setting the reference time Ro for change discrimination, the electrical components 10 to 13 may be shifted to the sleep state, when it is confirmed that all the electrical components are in the inoperative state. However, in this case, although at least one of the electrical components 10 to 13 is in the operative state, there is a possibility that the sleep condition may be temporarily and erroneously determined to be established due to noise or the like from, e.g., a control circuit.

Therefore, it is preferable that the reference time Ro be set long enough to prevent the erroneous discrimination.

In the above embodiment, various kinds of reference times Rn are set for discriminating by the discrimination means 23 whether or not the operating states of the electrical components 10 to 13 change, and the presence/absence of the change in state is discriminated on the basis of the reference time Rn selected in correspondence with the number of electrical components in the operative state. For this reason, the communication nodes 1 to 4 can be properly shifted to the sleep state without causing a dead battery.

More specifically, the reference time Ri used for change discrimination is set to be longest when one of the electrical components 10 to 13 is in the operative state, and the value of the reference time Rn is set to decrease as the number of electrical components in the operative state increases. For this reason, as a larger dark current flows, the communication nodes 1 to 4 can be shifted to the sleep state earlier, and any electrical component in the operative state is forcibly set in the inoperative state, thus effectively preventing a dead battery caused by a large amount of dark current. When the dead battery is less probable to occur, i.e., when the number of electrical components in the operative state is small, erroneous discrimination caused by an unnecessarily short reference time Rn can be prevented since the reference time Rn is set to be a long time.

Note that the reference time Rn for change discrimination may be increased stepwise in correspondence with the number of electrical components in the operative state. Alternatively, the reference time Rn for change discrimination may be set by calculating the amount of power consumption upon operation of the electrical components 10 to 13 in advance, and by reading out a reference time corresponding to the calculated power consumption from a graph of the reference time which is set in advance, as shown in FIG. 5.

In place of the above arrangement, as the number of electrical components in the operative state decreases, the reference time Rn may be shortened. With this arrangement, when one or a small number of the electrical components 10 to 13 are maintained in the operative state due to an operation error or failure, the reference time Rn is set to be short, and the communication nodes 1 to 4 can be shifted to the sleep state early.

When a large number of electrical components in the operative state are maintained in the operative state, and the driver highly probably intends to continue driving of the vehicle, the reference time Rn is set to be long. For this reason, erroneous discrimination of shifting the electrical components to the sleep state can be effectively prevented, even though the driver intends to continue driving of the vehicle.

In the multiplex transmission apparatus which is designed to periodically output a refresh signal indicating the state of the electrical component 10 from the signal output means 19 when the communication node 1 is in the wake-up state, it may be arranged that transmission of the refresh signal is stopped when it is confirmed that the state of the electrical component 10 has not changed for a predetermined period of time in a case where the ignition key switch 20 is in the OFF state. In this case, the communication nodes 1 to 4 can be easily and properly shifted to the sleep state in response to this operation.

In the above embodiment, when one of the input switches 6 to 9 is operated while the communication nodes 1 to 4 are in the sleep state, the wake-up signal and the operation command signal are output at a predetermined interval. For this reason, each electrical component can be properly and quickly operated in response to the operation of the input switches 6 to 9.

More specifically, as shown in FIG. 6, at a timing T2 after an elapse of a predetermined period of time from a timing T1 at which the input switch 6 of the first communication node 1 is turned on, the first communication node 1 outputs the wake-up signal A to the other communication nodes 2 to 4. For this reason, upon reception of the wake-up signal A, the second communication node 2 starts an operation for shifting to the wake-up state, and at a timing T3 after an elapse of a wake-up rise time ta from the timing T2, the communication node 2 is set in the wake-up state.

At a timing T4 after an elapse of a setting time tb which is longer than the wake-up rise time ta from the output timing T2 of the wake-up signal A, the operation command signal B is output for operating the electrical component 11 corresponding to the input switch 6. For this reason, at the output timing T4 of the operation command signal B, the second communication node 2 has already been set in the wake-up state. Therefore, at a timing T5 after an elapse of a predetermined period of time since reception of the operation command signal B, the communication node 2 can reliably operate the electrical component 11.

In addition, since the setting time tb of the output interval between the wake-up signal A and the operation command signal B is only slightly longer than the wake-up signal rise time ta, an unnecessary dark current can be prevented from flowing for a long period of time, and the electrical component 11 can be quickly operated as needed.

In the above embodiment, all the communication nodes 1 to 4 are simultaneously shifted from the sleep state to the wake-up state, as needed, or vice versa. Alternatively, only a communication node connected to an electrical component corresponding to the operated input switch may be shifted to the wake-up state, or whether or not the communication nodes 1 to 4 are independently shifted to the sleep state may be discriminated, and the communication nodes 1 to 4 may be independently shifted from the wake-up state to the sleep state in accordance with the discrimination result.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission apparatus which comprises a plurality of communication nodes connected to each other via a multiplex transmission path, and a plurality of electrical components to be controlled by the plurality of communication nodes, each of the plurality of communication nodes being set in one of an operative state, an inoperative state, and an operable state, comprising:

first detection means for detecting an ON/OFF state of an ignition key switch;

means for monitoring operative/inoperative states of the electrical components;

means for setting a predetermined reference time in accordance with the monitoring result;

second detection means for detecting a change in state of the electrical components within the reference time; and control means for, when the ignition key switch is in an OFF state, and it is detected that the state of the electrical components has not changed within the reference time, setting the communication node associated with control of the electrical components in the inoperative state.

2. The apparatus according to claim 1, wherein said control means sets the electrical components in the inoperative state when the ignition key switch is in the OFF state, and when said second detection means detects that the electrical components are in the operative state over the reference time.

3. The apparatus according to claim 1, wherein said reference time includes a first reference time corresponding to a case wherein all of the plurality of electrical components are in the inoperative state, and a second reference time corresponding to a case wherein at least one of the plurality of electrical components is in the operative state, and the first reference time is set to be shorter than the second reference time.

4. The apparatus according to claim 1, wherein a plurality of types of said reference time are prepared, and one of the plurality of types of said reference time is selected in correspondence with the number of said electrical components which are in the operative state.

5. The apparatus according to claim 4, wherein said plurality of types of said reference time are set to become shorter as the number of said electrical components which are in the operative state increases.

6. The apparatus according to claim 4, wherein said plurality of types of said reference time are set to become shorter as the number of said electrical components which are in the operative state decreases.

7. The apparatus according to claim 4, further comprising:
means for calculating the amount of power dissipated by said electrical components which are in the operative state, and
wherein said reference time is set on the basis of a predetermined correspondence between the amount of power consumption and a reference time.

8. The apparatus according to claim 1, further comprising:
means for detecting whether the communication node is in the operable state when the ignition key switch is in the OFF state; and
means for outputting a signal indicating that said communication node is in the operable state, and
wherein said control means stops outputting said signal when said communication node associated with control of said electrical components is set in the inoperative state.

9. The apparatus according to claim 8, wherein said signal is periodically output at a predetermined period.

10. A multiplex transmission apparatus which comprises a plurality of communication nodes connected to each other via a multiplex transmission path, and a plurality of electrical components to be controlled by the plurality of communication nodes, each of the plurality of communication nodes being set in one of an operative state, an inoperative state, and an operable state, comprising:
means for monitoring operative/inoperative states of the electrical components;
means for setting one of a plurality of predetermined reference times in accordance with the monitoring result;
detection means for detecting a change in state of the electrical components within the predetermined reference time; and
control means for, when an ignition key switch is in an OFF state, and it is detected that the state of the electrical components has not changed within the predetermined reference time, setting the communication node associated with control of the electrical components in the inoperative state, wherein the predetermined reference time is set in correspondence with the number of said electrical components which are in the operative state.

11. The apparatus according to claim 10, wherein said control means sets the electrical components in the inoperative state when the ignition key switch is in the OFF state, and when said detection means detects that the electrical components are in the operative state during the predetermined reference time.

12. The apparatus according to claim 10, wherein said plurality of predetermined reference times include a first reference time corresponding to a case wherein all of the plurality of electrical components are in the inoperative state, and a second reference time corresponding to a case wherein at least one of the plurality of electrical components is in the operative state, said first reference time being shorter than the second reference time.

13. The apparatus according to claim 10, wherein said plurality of predetermined reference times are set to become shorter as the number of said electrical components which are in the operative state increases.

14. The apparatus according to claim 10, wherein said plurality of predetermined reference times are set to become shorter as the number of said electrical components which are in the operative state decreases.

15. The apparatus according to claim 10, further comprising:
means for calculating an amount of power consumed by said electrical components which are in the operative state,
wherein said reference time is set on the basis of a predetermined correspondence between the amount of power consumption and a reference time.

16. The apparatus according to claim 10, further comprising:
means for detecting whether the communication node is in the operable state when the ignition key switch is in the OFF state; and
means for outputting a signal indicating that said communication node is in the operable state,
wherein said control means stops outputting said signal when said communication node associated with control of said electrical components is set in the inoperative state.

17. The apparatus according to claim 16, wherein said signal is periodically output at a predetermined period.

* * * * *